(No Model.)
J. J. R. PATRICK.
RUBBER DAM AND TAPE HOLDER.
No. 373,683. Patented Nov. 22, 1887.
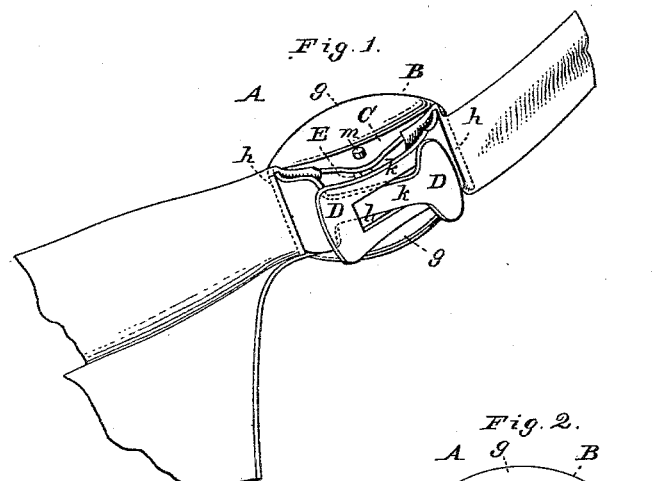
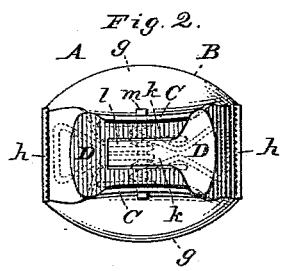
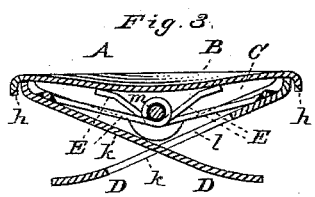
WITNESSES
Villette Anderson.
Philip C. Masi.
INVENTOR
John J. R. Patrick
by E. W. Anderson
Attorney

UNITED STATES PATENT OFFICE.

JOHN J. R. PATRICK, OF BELLEVILLE, ILLINOIS.

RUBBER-DAM AND TAPE HOLDER.

SPECIFICATION forming part of Letters Patent No. 373,683, dated November 22, 1887.

Application filed June 25, 1887. Serial No. 242,513. (No model.)

*To all whom it may concern:*

Be it known that I, JOHN J. R. PATRICK, a citizen of the United States, resident at Belleville, in the county of St. Clair and State of Illinois, have invented certain new and useful Improvements in Rubber-Dam and Tape Holders; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a perspective view. Fig. 2 is an outside or front view. Fig. 3 is a horizontal section.

My invention has relation to a new and valuable improvement in devices for keeping rubber dam on the stretch when adjusted around the teeth for the purpose of excluding moisture therefrom during the operation of filling.

As now usually made rubber-dam holders have single spring clamps or jaws fastened to plates called "guards," which come in contact with the cheeks of the patient, and to the rear ends of these single jaw-clamps an elastic braid, which passes around the head of the patient, is fastened. This braid is permanently attached to the clamp, and it is evident that the employment of such permanently-connected braid is not only uncleanly, but also liable to transmit scalp diseases.

The object of my invention is to provide a simple, cleanly, and convenient durable clamp for engaging and holding the edge of the rubber dam in one of its clamps and the end of an elastic or braid band in the opposite clamp, so that either or both of the articles may be disengaged from the clamp and new ones substituted.

In the accompanying drawings, the letter A designates the double spring-clamp, which consists of the pad-shaped base B, the side bearings, C, the crossing or interlocking movable jaws D D, and the springs E.

The plate or base as usually constructed by me is made in pad form, being somewhat concave in its under or bearing side and rounded up on its marginal portion, so that it will conform to the contour of the cheek at the place where it is usually applied. The bearings C for the pivot of the movable jaws are usually soldered to the plate just inside the rounded lateral flanges $g\ g$. At the ends of the plate the metal is serrated and turned up to form the fixed jaws $h\ h$, as shown. Each movable jaw D is formed with a serrated or biting edge turned toward the base-plate, and with a shank, $k$, which extends therefrom in an inclined direction upward and toward the other end of the plate. As these shanks extend in opposite directions, they cross each other, and one is usually slotted, as indicated at $l$, the other shank passing through the slot, so that they are interlocked. The spiral springs E are bent around the central transverse pin, $m$, and serve as connections thereto for the jaws, to which they are respectively secured.

In using these holders the rubber dam is caught in the clamp-jaws, as shown at $h$, and the end of the tape is secured in the opposite clamp of the holder. The dam and piece of tape can be quickly removed from the holder and thrown away after the work has been concluded. The form of the plate-pad is such that no mark will be left on the cheek after a protracted operation.

Having described this invention, what I claim, and desire to secure by Letters Patent, is—

For dental purposes, a double spring-clamp rubber-dam and tape holder, consisting of a pad-form base-plate having a stationary jaw at each end, and the movable jaws having interlocking shanks fastened to the spiral springs E, said springs being pivoted on the transverse pin $m$, substantially as specified.

In testimony whereof I affix my signature in presence of two witnesses.

JOHN J. R. PATRICK.

Witnesses:
HUGO E. WAUGELIN,
FRED SUNKEL.